A. R. ANGUS.
RAILWAY SAFE RUNNING DEVICE.
APPLICATION FILED JAN. 18, 1911.

1,189,224.

Patented July 4, 1916.
6 SHEETS—SHEET 1.

WITNESSES:
John C. Sanders
M. B. Cottrell

INVENTOR:
Arthur Reginald Angus
BY
Wm. Nassau White
ATT'Y

A. R. ANGUS.
RAILWAY SAFE RUNNING DEVICE.
APPLICATION FILED JAN. 18, 1911.

1,189,224.

Patented July 4, 1916.
6 SHEETS—SHEET 4.

Fig. 6.

Witnesses:

Inventor:

ATTY.

A. R. ANGUS.
RAILWAY SAFE RUNNING DEVICE.
APPLICATION FILED JAN. 18, 1911.

1,189,224.

Patented July 4, 1916.
6 SHEETS—SHEET 5.

Witnesses:
John C. Sanders
Albert F. Neuman

Inventor
Arthur Reginald Angus
BY
ATT'Y

A. R. ANGUS.
RAILWAY SAFE RUNNING DEVICE.
APPLICATION FILED JAN. 18, 1911.

1,189,224.

Patented July 4, 1916.
6 SHEETS—SHEET 6.

UNITED STATES PATENT OFFICE.

ARTHUR REGINALD ANGUS, OF SPIT ROAD MOSMAN, NEW SOUTH WALES, AUSTRALIA.

RAILWAY SAFE-RUNNING DEVICE.

1,189,224.   Specification of Letters Patent.   Patented July 4, 1916.

Application filed January 18, 1911. Serial No. 603,377.

*To all whom it may concern:*

Be it known that I, ARTHUR REGINALD ANGUS, a subject of the King of Great Britain, residing at Spit Road Mosman, in the State of New South Wales and Commonwealth of Australia, solicitor, have invented new and useful Improvements in or Relating to Railway Safe-Running Devices, ("A"), of which the following is a specification.

This invention relates to the construction and application of safe running devices for the protection of trains against collision one with another, and seeks subject to the limitations herein indicated to eliminate the risk of collisions between railway trains which is due to the personal equation—that is to say, to human weakness or fallibility. Apparatus according to the invention is so arranged that a locomotive or train in its passage along a railway track will at certain fixed places test or determine as herein mentioned whether a circuit is complete or not and so ascertain the condition of the route and when such is not clear will give a warning of same and arrest the progress of the locomotive or train if necessary.

The invention has been specially devised to provide what I term factors of safety (that is safeguards, to the extent herein indicated or mentioned) against failure or derangement of apparatus or neglect or errors in working on the part of the signalmen or others controlling the movement of trains. Ordinarily railway track signals are used if desired, or miniature signals may be used in the cab of the locomotive and if desired in the brakevan (*i. e.*, a vehicle provided with apparatus for the actuation of the brakes of the train) or like vehicle; or both track and miniature signals as aforesaid may be used.

Apparatus according to the invention may be varied to suit the varying conditions of railway systems and is such that a signalman or other person may, by the movement of a lever or levers or the like, enable a train automatically to disconnect electrically the contacts of a pair, or of pairs, of contacts placed on or about, or adjacent to the railway track, and hereinafter referred to as track contacts, or prevent the train from disconnecting the contacts of a pair, or of pairs of track-contacts for the purposes herein mentioned.

The invention consists in the various features, constructions, and combinations of parts hereinafter described and particularly defined in the claims hereof.

In order to explain the invention clearly the same is illustrated by the accompanying drawings which show apparatus according to the invention.

In the drawings: Fig. 1' is a view showing the track contacts of Fig. 1 diagrammatically in side elevation. Figs. 7$^a$ and 7$^b$ show diagrammatically connections to levers controlled by a bonded section of track.

The general arrangement of the track and train circuits is such that a train on effecting contact with track contacts is adapted to complete an electric circuit which passes through contacts which are only bridged when apparatus relating to the control of the road for the train is in the safe position for the train. If the train is enabled to complete this circuit an electro-magnetic device is operated which breaks the electrical connection between a pair of track contacts in advance of the train. If the train effects contact with these last mentioned contacts while they are electrically connected together an electric circuit is completed which includes a warning, stopping, or other indicating device on the train which is thereby operated.

Figure 1:
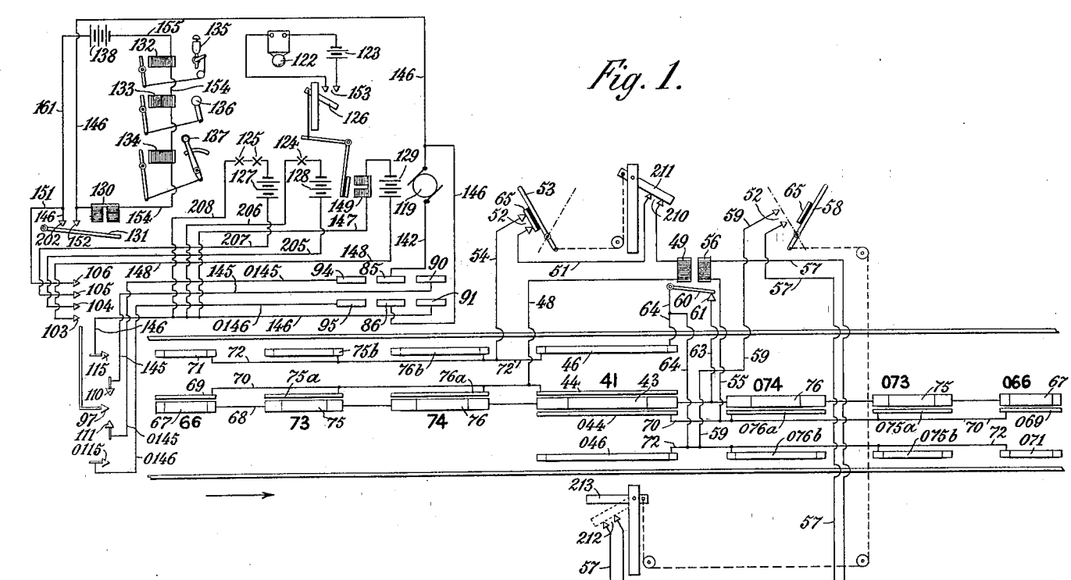
—Figure 1 is a diagrammatic view of a section of straight track and track apparatus connected thereto and of apparatus on the train adapted to operate in conjunction with the track apparatus shown therein.

In the drawings, Fig. 1 is a diagrammatic view of a section of track and of apparatus relating thereto, the apparatus being adapted for trains to run in either direction over the section of track. In this figure the apparatus relating to the control of the road for a train consists of signal levers and signals. Along and centrally of the track are arranged compound track contacts 66, 73, 74, 41, 074, 073, 066, each of which comprises some non-conducting material having ramp ends, and a top contact plate, the top contact plates being numbered 67, 75, 76, 43, 76, 75, and 67, respectively. The contacts 66, 73, 74, 074, 073, and 066, have single side or controller contact plates numbered respectively 69, 75ª, 76ª, 076ª, 075ª, and 069. The contact 41 has two sides or controller contacts 44, and 044. Laterally of each of these compound contacts is arranged a return contact numbered as shown; in the case of contact 41 two lateral return contacts 46 and 046 are employed. The contacts and lateral and side contact plates relating to a train performing a journey in the direction of the arrow, say a down journey, are indicated by ordinary numbers, while the corresponding contacts relating to a train performing an up journey are indicated by the same numbers with the addition of the prefix 0.

The various compound contacts have their top contacting surfaces at different heights according to the effects to be produced thereby on two trains. The relative heights of the compound contacts above the rails in the example are indicated by Fig. 1′, which shows the compound contacts diagrammatically in side elevation. A stop contact is preferably higher than a signal contact and from Fig. 1′ it will be seen that in the example the contact 41, which is a stop contact, is the highest compound contact.

The heights of the signal contacts differ according to the different signals which they are intended to produce on the train in the manner hereinafter explained.

Figure 5:
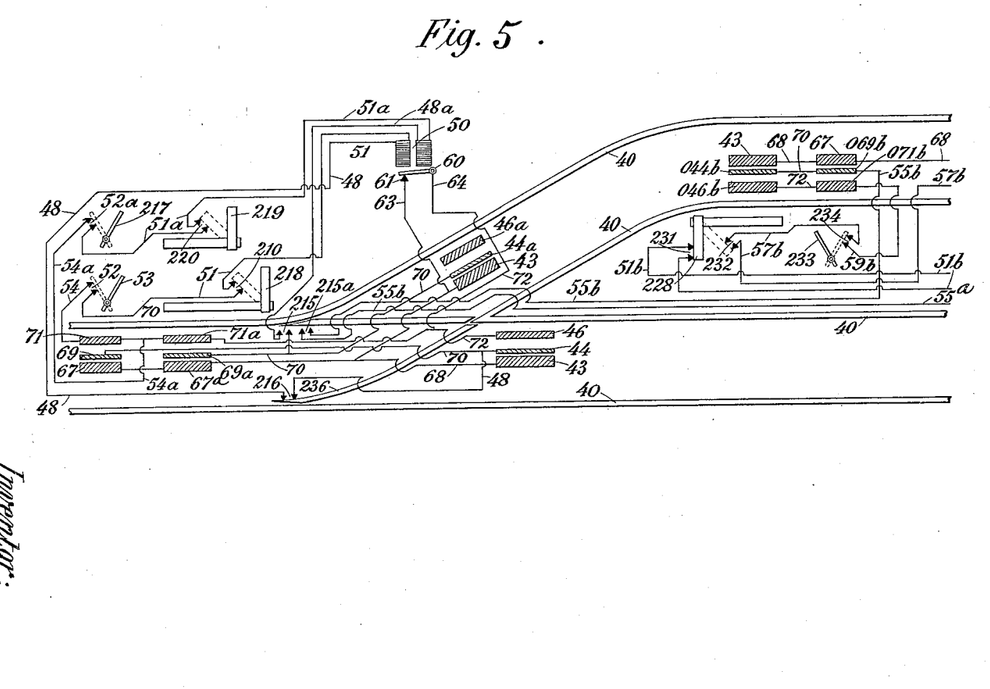
Figs. 5 and 6 are diagrammatic views showing the two ends of a siding and the arrangement of apparatus according to this invention relating thereto.
Figure 6:
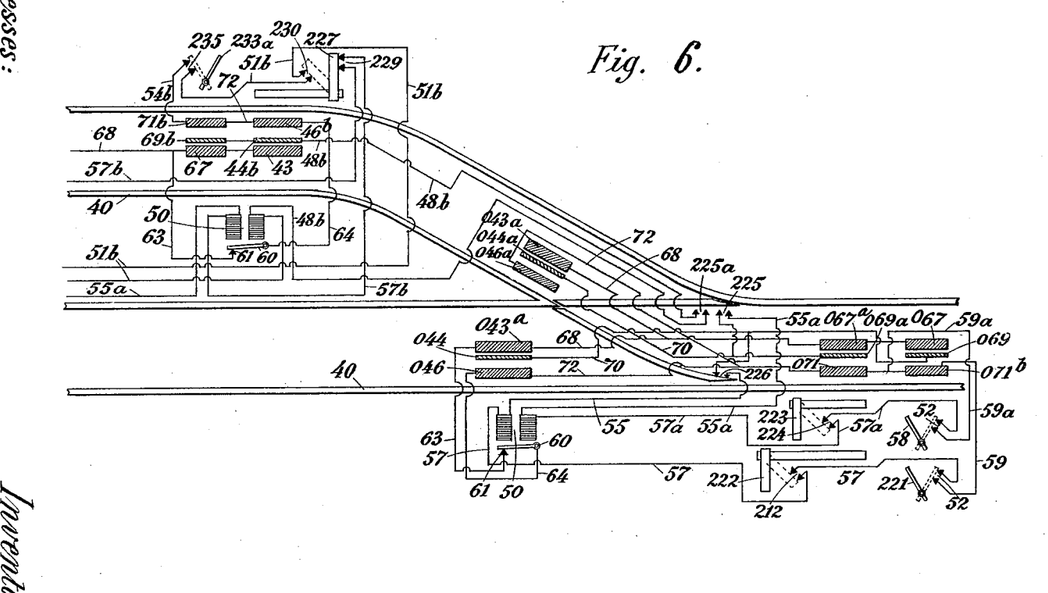

Signal contacts such as 73, 74, 073, and 074, differing in height from the warning contacts 66 and 066, need not necessarily be employed for ordinary straight track conditions, but will be found useful with proper connections such as shown in Figs. 5 and 6, for testing or warning purposes at places where more than one track diverges from the main line, and are shown in Fig. 1 chiefly for the purpose of describing the complete train apparatus. The lateral or return contacts corresponding to the compound contacts are all of the same height.

In areas where traffic is heavy and block sections short it is preferable for the signal contacts to be of sufficient length to allow the driver, while his locomotive is in contact therewith, to stop his locomotive before it passes off the contact and consequently before it can be automatically stopped by the corresponding stop contact, so that as soon as the warning ceases he will be able to proceed. Where traffic requires, it may be found advantageous that a signal contact be placed adjacent to a corresponding stop contact and a duplicate of the signal contact placed at a suitable distance from the contact which it duplicates so that when a train receives a warning on coming into contact therewith the driver may be prepared to stop immediately he runs on to the duplicated signal contact and wait thereon until he is given an intimation that the track is clear for him to proceed.

The top contact plates of the compound contacts are normally electrically connected to the corresponding lateral or return contacts through wires 64, armature 60, contact 61, and wire 63. The attraction of the armature 60 by either of the magnets 49 and 56 breaks this connection at the contacts 61 and 80 and so disconnects the top contact plates of the compound contacts from their corresponding lateral or return contacts.

The signal 211 and signal lever 53 relate to the down journey and signal 213 and signal lever 58 relate to the up journey. If the signal 211 is in line-clear position and the signal lever 53 is correspondingly so placed the side or controlling contact plates of the compound contacts relating to the down journey are connected electrically to the corresponding lateral or return contacts through wire 70, wire 48, magnet 49, contacts 210, wire 51, contacts 52, insulated contact plate 65, wire 54, and wire 72. If either the signal 211 or the signal lever 53, or both, is or are not in line-clear position it will be obvious that the above described electrical connection will be broken at the contacts 210 or 52 or both. Similarly if the signal 213 is in the line-clear position (dotted) and the signal lever 58 is correspondingly so placed the side or controlling contact plates of the compound contacts relating to the up journey are connected to the corresponding lateral or return contacts through wire 70, wire 55, magnet 56, contacts 212, wire 57, contacts 52, insulated contact plates 65, wire 59, and wire 72. If either the signal 213, or the signal lever 53, or both, is or are not in line-clear position it will be obvious that the above described electrical connection will be broken at the contacts 212 or 52, or both.

Figure 3:
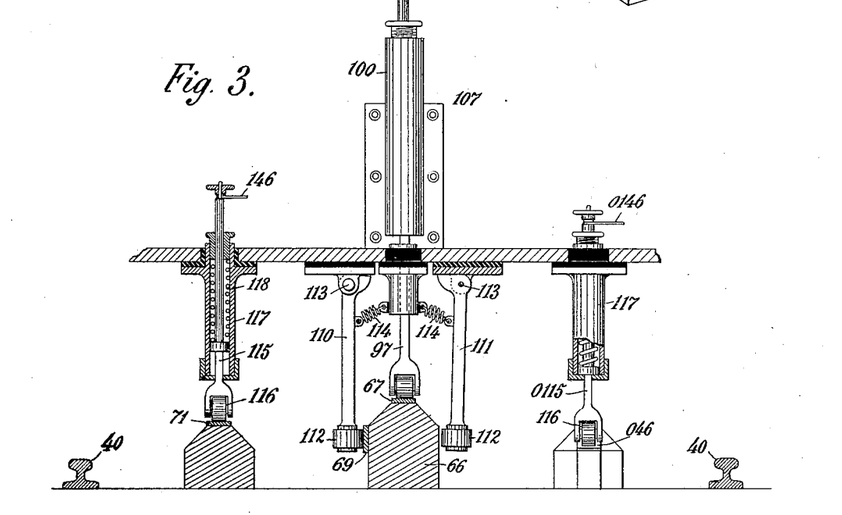
Fig. 3 is a view, partly in section, of a set of depending contact rods on the train in contact with a set of track contacts.

Attached to and depending from a convenient part of the locomotive or train is a set of contacting devices (Fig. 3) comprising side contacting devices 115 and 0115 which slide within casings 117 insulated from the frame of the locomotive and are pressed downward by springs 118. The lower end of each contacting device carries a roller 116 and the upper end is connected to an electrical conductor 146. These two side contacting devices are so located with respect to the locomotive or train as to engage with the contact plates on the lateral or return track contacts relating to the two directions of travel respectively.

The central contacting device 97 (Figs. 2 and 3) is mounted so as to slide in a casing 100 connected to a box 107 attached to the locomotive, to an extent depending upon the height of the compound contact with which it comes into contact. The lower end of the contacting device 97 is provided with a roller 98 and its upper end is provided with a collar against which acts a spring within the casing 100 and by which it is maintained in contact with a track contact with which it comes into contact. The upper end of the contacting device 97 carries a spring contacting finger 101, which is adapted to effect electrical contact with the insulated contacts 103, 104, 105, and 106 connected respectively to the conductors 148, 205, 207, and 151, according to the displacements given to the contacting device 97 by the track contacts. The relative heights of the top contacting surfaces 43, 76, 75 and 67 of the compound contacts are indicated diagrammatically in Fig. 2.

The contacting devices 110 and 111 (Fig. 3) are pivoted at 113 and provided with rollers 112 at their ends and are so arranged as to effect contact with the side or controlling contact plates on the compound contacts, springs 114 being provided to hold them in close contact with the sides of the compound contacts.

On the locomotive or train is arranged apparatus for producing different signals thereon on contact of the train with compound contacts which are electrically connected with their corresponding lateral or return contacts and also a generator of electricity 119 (Fig. 1) which is adapted on contact of the train with a controller contact and a return contact and the consequent completion of the circuit of the electromagnet 49 or 56 to cause the attraction of the armature 60 and thereby to cause signal and stop contacts to be disconnected electrically from corresponding lateral or return contacts so as to prevent a signal or a stopping operation from being performed on the train.

The generator 119 is adapted to be connected either to the contacting device 110 and 115 relating to the down journey or to the contacting devices 111 and 0115 relating to the up journey according to the position of a reversing gear switch (indicated diagrammatically in Fig. 1) which is adapted to be moved into one or other or its positions according to the position of the reversing gear of the locomotive. The movable part of the switch, carrying the contact plates 85 and 86 connected respectively by wires 142 and 146 to the poles of the generator 119, is suitably connected to the reversing gear of the locomotive so as to be moved thereby either into a position in which the plates 85 and 86 effect contact electrically with the plates 94 and 95, which are connected respectively by wires 0145 and 0146 to the contacting devices 111 and 0115, or into a position in which the plates 85 and 86 effect contact electrically with the plates 90 and 91, which are connected respectively by wires 145 and 146 to the contacting devices 110 and 115. It will therefore be seen that according to the position of the reversing gear switch the train is adapted on effecting contact with a controller contact plate such as 69 and a corresponding return contact such as 71 to pass current through the track circuit connected to the contacts in question if that circuit is not broken at the contacts 210 or 52, or 212 or 52 as the case may be and thereby to energize the magnet 49 or 56 to attract the armature 60 and so to disconnect signal or stop contacts from return contacts and thereby render those contacts inoperative to produce a signaling or stopping operation on the train.

When a train performing a down journey comes into contact with compound contact 66 and return contact 71, and is unable by contact with the side controlling contact plate 69 to cause the attractions of the armature 60 by the magnet 49 a signaling circuit on the train is completed through the contacting device 97 (which is lifted by contact 66 to effect contact with contact 103), wire 148, battery 129, magnet 149, wire 147, wire 146, side contacting device 115, return contact 71, wire 72, contact plate 46, wire 64, armature 60, contact 61, wire 63, contact plate 43, contact plate 76, contact plate 75, wire 68, and contact plate 67. The armature of magnet 149 is thus attracted and consequently raises the miniature visual signal 126 to danger position so as to close at the contacts 153 the local circuit of battery 123 and bell 122, so that an audible danger signal is produced in addition to the visual signal.

When a train performing a down journey comes into contact with compound contact 73 and return contact 75$^b$ and is unable by contact with the side controlling contact plate 75$^a$ to cause the attraction of the armature 60 by the magnet 49 a signaling circuit on the train is completed through the contacting device 97 (which is lifted by contact 73 to effect contact with contact 104), wire 205, battery 128, glow lamp 124, wire 206, wire 146, side contacting device 115, return contact 75$^b$, wire 72, contact plate 46, wire 64, armature 60, contact 61, wire 63, contact plate 43, contact plate 76, and contact plate 75. The lighting of the glow lamps 124 which constitutes a visual danger signal is thus produced.

When a train performing a down journey comes into contact with compound contact 74 and return contact 76$^b$ and is unable by contact with the side controlling contact plate 76$^a$ to cause the attraction of the armature 60 by the magnet 49 a signaling circuit on the train is completed, through the contacting device 97 (which is lifted by contact 74 to effect contact with contact 105), wire 207, battery 127, glow lamps 125, wire 208, wire 146, side contacting device 115, return contact 76$^b$, wire 72, contact plate 46, wire 64, armature 60, contact 61, wire 63, contact plate 43, and contact plate 76. The lighting of the two glow lamps 125 which constitutes another form of visual danger signal is thus produced.

When a train performing a down journey comes into contact with compound contact 41 and return contact 46 and is unable by contact with the side controlling contact plate 44 to cause the attraction of the armature 60 by the magnet 49 a stopping operation is brought about on the train by the completion of a circuit through the contacting device 97 which is lifted by contact 43 to effect contact with contact 106, wire 151, wire 161, battery 138, wire 155, magnet 132, magnet 133, magnet 134, wire 154, magnet 130, wire 146, contact plates 86 and 91 of the reversing gear switch, wire 146, side contacting device 115, return contact 46, wire 64, armature 60, contact 61, wire 63, and contact plate 43.

The magnet 132 is accordingly energized and attracting its armature causes the operation of the whistle 135; the magnet 133 is energized and attracting its armature operates lever 136 and applies the brakes on the train; the magnet 134 is energized and attracting its armature operates lever 137 to shut off steam from the locomotive, and the magnet 130 is energized and thereby caused to attract its armature 131 to bridge contacts 202 and 152. The bridging of the contacts 202 and 152 maintains the circuit through battery 138 and magnets 132, 133, 134, and 130, so that warning and stopping operations are maintained on the train after the train itself has passed out of contact with the stopping contact 41 which originally produced the warning and stopping operations. The armature 131 is intended to be adapted to be moved by hand to break the above mentioned circuit at the contacts 202 and 152 in order to allow the train to proceed after it has once been stopped. The operation for a train performing a down journey is similar to that described above with the exception that the side contacting device 0115 and the corresponding return contacts 046, 076$^b$, 075$^b$, 071, and the side contacting device 111 and the corresponding controlling contact plates 044, 076$^a$, 075$^a$, and 069 are used. It will therefore be seen that a train is adapted to complete a testing circuit which passes through apparatus relating to the making of a safe road for the train and if it fails to complete that circuit to have a warning signaling or stopping operation performed thereon according to the particular contact with which it is effecting contact.

The levers 53 and 58 relating to the control of roads for conflicting directions of travel should be interlocked in such a manner that when the testing circuit for a train on one journey is made the circuit for a train on a conflicting journey on the same track, or on a fouling track, is broken. This interlocking is effected by means illustrated in Fig. 4 of the drawings.

Figures 2, 4:
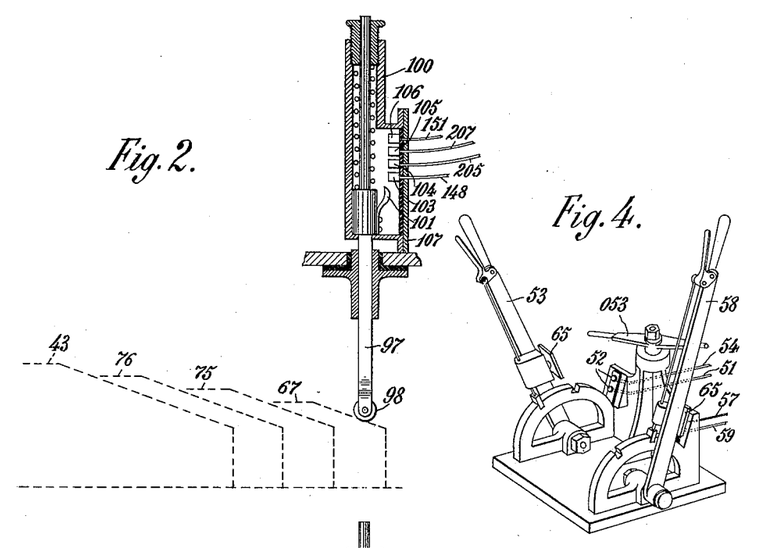
Fig. 2 is a sectional view of a central depending contact device on the train.
Fig. 4 is a perspective view of a pair of interlocked levers adapted to be prevented from simultaneously closing conflicting circuits through track apparatus.

A lever such as 53 relating say to the down journey is connected to a lever such as 58 relating to the up journey by means of a fulcrumed rod such as 053 so that by operating either lever the corresponding contacts 52 can be bridged but that both the levers 53 and 58 cannot at the same time bridge their respective contacts 52. It will thus be seen that when a signalman operates the lever 58 and bridges the corresponding contacts 52 the circuit relating to the corresponding track contacts for the up journey of the train will be made and the train given clearance as hereinbefore described but the lever 53 relating to the down journey will not bridge the contacts 52 so that the circuits relating to track contacts for a train on its down journey will not be made and so a train on passing over any of the last mentioned track contacts will not obtain clearance but will be warned and failing to stop will on making contact as herein mentioned with a stop contact on the track be stopped as hereinbefore described.

Although the apparatus hereinbefore described with reference to Fig. 1 relates to signals and signal levers for controlling a clear road for a train it will be obvious that instead of signal levers point levers might equally well be employed and instead of the setting of signals the setting of points might be tested by a train in a similar manner. It will also be obvious that any number of points, signals and levers or the like relating to the making of a clear road may be included in the same testing circuit.

Figs. 5 and 6 show the two ends of a siding provided at one end with signal levers 53 and 217 for the signal arms 218 and 219, contact points 210 and 220 being provided on suitable supports adapted to be bridged by contact plates on said signal arms and at the other end with a similar set of levers 58 and 221 and signal arms 222 and 223 adapted by means of contact plates to bridge contact points 212 and 224 on suitable supports. At places at the two ends of the siding are sets of suitable pairs of contact points 215, 215$^a$, and 216, and 225, 225$^a$, and 226 respectively, of which the contact points 215 are adapted to make or break the connection of contacts 69$^a$, 71$^a$, 44$^a$, 46$^a$, the contact points 215$^a$ to make or break that of contacts 069$^b$, 071$^b$, 044$^b$, 046$^b$, and the contact points 216 to make or break that of contacts 60, 71, 44, 46, while the contact points 225, 225ª, and 226 are adapted to make or break the connection of similar contacts—namely the contact points 225 that of contacts 069ª, 071ª, 044ª, 046ª, the contact points 225ª that of contacts 69ᵇ, 71ᵇ, 44ᵇ, 46ᵇ, and the contact points 226 that of contacts 069, 071, 044, 046. Also on the main line and near the points are shown the corresponding signal contacts 67 and 67ª of which the contacts 67 are of the height to move the contact rod 97 (Fig. 1) into contact with the contact 103 to operate the signal 126, and the contacts 67ª are of a height to move the contact rod 97 into contact with the contact 104 to light the lamp 124 and again on the siding signal arms 227 and 228 adapted with contact plates to bridge corresponding contact points 229, 230, 231, and 232, and operating levers 233, 233ª also with sets of contact points 234 and 235 adapted to be bridged by contact plates respectively.

A train running on the down journey and desiring to continue on the main line will, if the lever 53 is set to bridge contacts 52 and the points 236 are so set that the contacts 216 are bridged as well as signal contacts 210 by the contact plate on signal arm 218, break the circuit of 63 and 64 at the contact point 61 as hereinbefore described and the train will obtain clearance to continue on the main line. If the contacts 52 are not bridged by the lever 53 or the points 236 are not so set that the contacts 216 are bridged or the signal arm 218 is not so set that the contacts 210 are bridged by the contact plate thereon, the train will not, on coming into contact with the track contacts 69 and 71, complete the circuit of the corresponding magnet 50 and consequently will not be able to break by means of the corresponding armature 60 the connection between the track contacts 67 and 71 and, therefore, when the train is in contact with the signal contact 67 an indication will be given, as hereinbefore described, of danger as regards the main line by the raising of the semaphore arm 126 and the consequent ringing of the bell 122. If a train on the down journey is intended to enter the siding then the lever 217 must be operated to bridge the corresponding contacts 52ª and a suitable contact plate on the moving blade of the points must bridge the contacts 215 and the contact plate on the signal arm 219 must bridge the contact points 220 so that the required testing circuit being complete the train will be enabled to enter the siding. If the corresponding contacts 52ª are not bridged by the lever 217 or the contacts 215 are not bridged by the plate on the blade of the points or the contact points 220 are not bridged by the contact plate on the signal arm 219 the train on coming into contact with track contacts 69ª and 71ª relating to the siding will not be able to complete the circuit of the corresponding magnet 50 and consequently will not be able to break by means of the corresponding armature 60 the connection between the track contacts 67ª and 71ª and, therefore, when the train is in contact with the signal contact 67ª an indication will be given, as hereinbefore described, as regards the siding by the lighting of the lamp 124.

When a train is on the siding and wishes to proceed on the up journey the contacts 234 must be bridged by the lever 233, also contacts 232 by the signal arm 228, and the contacts 229 by a suitable contact plate on the signal arm 227, and contacts 215ª by the moving of the points, thus enabling the circuits at contact 61ᵇ to be broken and the train to obtain clearance but a train on the main line on the down journey is unable to break the corresponding circuit at 61 and is protected as hereinbefore described.

When a train running on the main line on the up journey desires to pass the siding then the lever 221 must be operated to bridge the contacts 52 and a suitable contact plate on the blade of the moving point must bridge the contacts 226 and a suitable contact plate on the signal arm 222 must bridge the contacts 212. Again if a train desires to enter the siding on the up journey then the lever 58 must be operated to bridge the corresponding contacts 52 and a suitable plate on the signal arm 223 must bridge the contacts 224 and a suitable contact plate on the moving blade of the points must bridge the corresponding contacts 225. Again when a train is on the siding and wishes to proceed on the down journey the contacts 235 must be bridged by the lever 233ª, and the contacts 231 by signal arm 228 and contacts 230 by signal arm 227, and corresponding contacts 225ª relating to the moving blade of the points should in the manner hereinbefore described also be bridged to complete the required testing circuit to enable the train to obtain clearance.

It should be observed that, in the particular arrangement shown in the figures it is assumed that the signal and point levers relating to the down journeys are interlocked mechanically with the signal and point levers relating to up journeys both on the siding and on the corresponding portion of the main line, so that, though the mechanical interlocking seeks to prevent trains performing conflicting journeys from colliding, the "interlocking in effect" illustrated by Figs. 5 and 6 relates only to the clearing and non-clearing of trains if the roads on which they are to travel are not made for certain routes on the down and up journeys respectively and the warning of trains with a view to preventing collisions between trains located on the siding and on the main line respectively, and the stopping of trains, to the extent herein indicated.

None of the stopping contacts 43 for the main line and the siding located immediately after the points on the down and up journeys respectively is intended normally to come into operation when the corresponding road is set. If, however, the signalman desires to warn and, if necessary, automatically stop a train after setting the points for the corresponding road he moves the corresponding lever 53 so as to break the connection between the corresponding contacts 52, and it may be also breaks the connection of the corresponding contacts by raising the corresponding signal arm, so that when a train arrives at the corresponding contact 67 or 67ª it will be warned and when it arrives at the corresponding stopping contact 43 it will be automatically stopped.

Under the term "train" I include a locomotive or brakevan or like vehicle adapted as herein mentioned. In the case of a brakevan or like vehicle parts only required on a locomotive—such as apparatus for shutting off steam—may be omitted and the reversing gear switch is adapted to be operated by the guard or the like.

The train should be fitted with a continuous automatic brake, which may be an air, vacuum, or like brake.

It is obvious that modifications may be made in the apparatus hereinbefore described without altering the invention—for example, any known form of electrical return, that is to say, metallic, earth or rail return—may be used where desired, and that where a rail return is used the corresponding contacting devices may be dispensed with. Also in order to allow for the risk of failure of generators on the train a set of generators may be substituted for a single generator and so arranged that failure of one generator will switch into circuit another one of the set. Further, the sets of contacting devices may be duplicated as many times as desired both on the locomotive and on other parts of the train in order to allow for the possibility of breakage or failure from any other cause of a particular set of contacting devices.

Figure 7A:
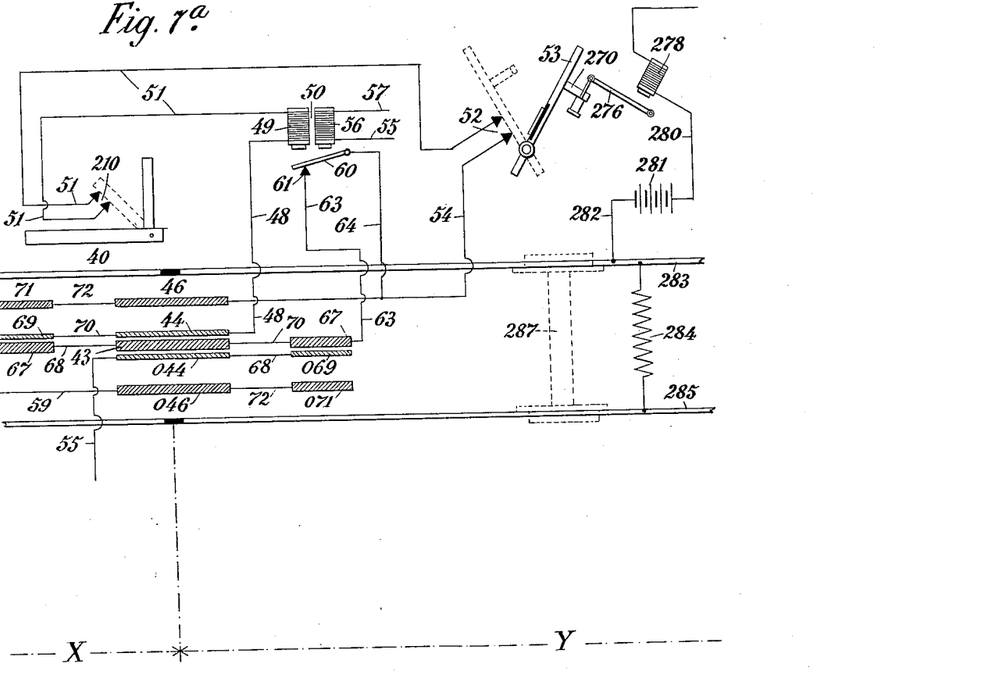
Figure 7B:
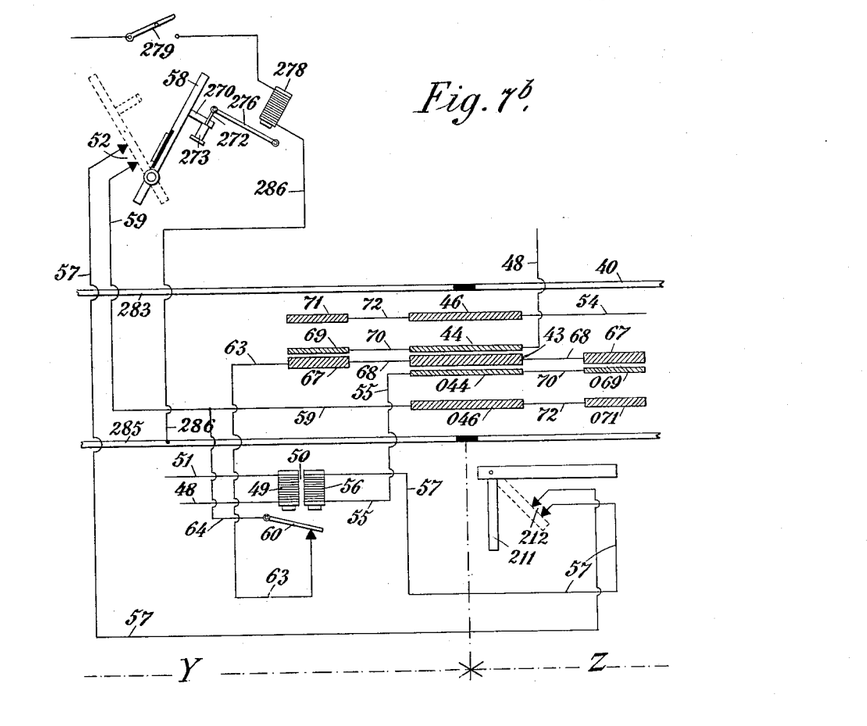
Figure 8:
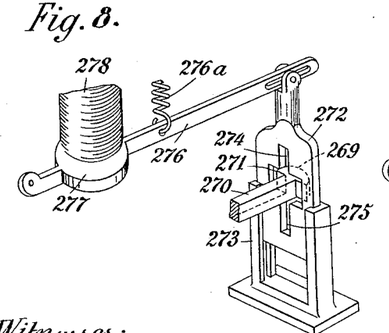
Figs. 8, 9, and 10 are perspective views of a locking device.
Figure 9:
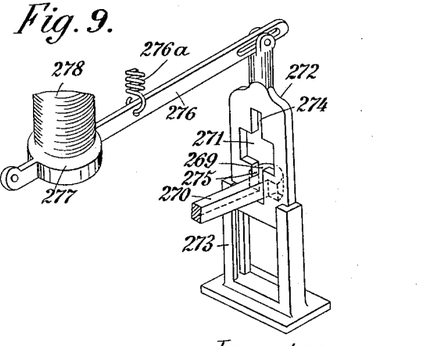
Figure 10:
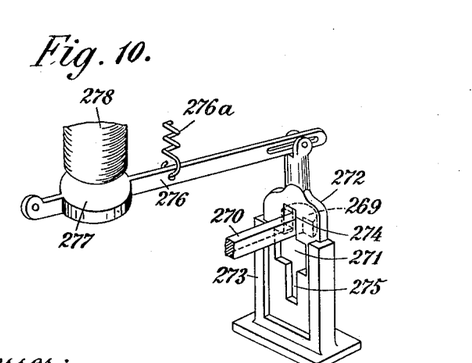

Figs. 7ª and 7ᵇ show the track 40 divided into sections. The rails of the section Y are bonded and insulated from similar sections X and Z or from the main track as may be desired. Each such insulated section as shown in Figs. 7ª and 7ᵇ has a set of signal and stop contacts as hereinbefore described, also signals and signal levers the latter being adapted to be locked by a device similar to that shown in Figs. 8 to 10 inclusive. The tappets of signal levers 53 and 58 have each a studded or projecting head 269 adapted to pass through the opening 271 of a vertical locking plate 272 slidable in the frame 273, the said plate being supported by lever 276, which is an extension of armature 277 of the magnet 278. The said armature is pivoted or fulcrumed and works in conjunction with a spring 276ª in the known manner. The magnets 278 are connected through switch 279 thence by wire 280 to battery 281, wire 282 to rail 283, resistance coil 284, rail 285, wire 286, back to magnets. When there is no train upon the section Y, the current from the battery 281 (which it is intended should be switched on and off as required by a signalman by switch 279) will flow through the locking circuit described and thus energize the magnets 278 sufficiently to place the orifice 271 of each plate 272 into juxtaposition with the studded head 269 of the corresponding tappet and thus allow the tappets to be pulled away and a signal set for line clear, but immediately a train enters upon the section, then, the levers 53 and 58 being in the positions shown in full lines in Fig. 7ª and 7ᵇ the current flows mainly through the wheels and axles 287 shunting the resistance 284 and increasing the current through magnets 278 thereby lifting the locking plate 272 (Fig. 9) so that the heads 269 of the tappets 270 become engaged by the walls of the vertical slot 275, and thus prevent the levers 53 and 58 from being operated. Again should current from the battery fail through some cause or other each plate 272 would fall (Fig. 10) and the head 269 of the corresponding tappet 270 would consequently engage with the walls of the upper vertical slot 274 and the levers 53 and 58 would thus be prevented from being operated.

It is intended that the signalman (after closing the switch 279 in the locking circuit which, according to the condition of the said section Y, releases or does not release the tappets and permits the lever 53 or 58 to be operated) by the movement of the lever 58 should bridge contacts 52 in the circuit comprising wire 59, contact points 52, wire 57, contacts 212, on signal arm 211, magnet coil 56, and testing contact 044, and return contact 069, thus enabling a train entering from Z to test and gain entrance to the said bonded section. If, however, the said section is occupied or the circuit relating to the locking magnet is not closed or in order it will not be possible to bridge the contact 52 referred to by the lever 58 to allow a train to enter and the train on passing over signal or stop contacts will be warned and stopped as beforementioned. The said testing circuit may if desired be partially completed through contacts on the lock armature which are bridged when the same is in a position corresponding to a cleared or unoccupied section "Y." Similarly the entrance to the section Y on the down journey or to other sections may be controlled in like manner.

What I claim is:—

1. Railway safe running apparatus comprising track contacts, means on a train adapted to make contact with said track contacts, appliances for regulating a road corresponding to one of said track contacts, means adapted to be affected by said appliances so as to enable said train on making contact with the last mentioned track contact to complete a circuit only when said appliances are properly set for a train to proceed along said road, another circuit, means adapted to cause the second mentioned circuit to be broken by the completion of the first mentioned circuit, said circuits including in common one of said track contacts, and means adapted to cause the second mentioned circuit when unbroken to give an indication automatically on said train during the contact thereof with said last mentioned track contact.

2. Railway safe running apparatus comprising track contacts, means on a train adapted to make contact with said track contacts, appliances for regulating a road corresponding to one of said track contacts, means adapted to be affected by said appliances so as to enable said train on making contact with the last mentioned track contact to complete a circuit only when said appliances are properly set for a train to proceed along said road, another circuit, means adapted to cause the second mentioned circuit to be broken by the completion of the first mentioned circuit, said circuits including in common one of said contacts, means adapted to cause the second mentioned circuit when unbroken to give an indication automatically on said train during the contact thereof with said last mentioned track contact, and means adapted subsequently to stop the train automatically on its continuing its journey.

3. Railway safe running apparatus comprising track contacts, means on a train adapted to make contact with said track contacts, appliances for regulating a road corresponding to one of said track contacts, means adapted to be affected by said appliances so as to enable said train on making contact with the last mentioned track contact to complete a circuit only when said appliances are properly set for a train to proceed along said road, another circuit, means adapted to cause the second mentioned circuit to be broken by the completion of the first mentioned circuit, said circuits including in common one of said track contacts, means adapted to cause the second mentioned circuit when unbroken to give an indication automatically on said train during the contact thereof with said last mentioned track contact, and means adapted subsequently to stop the train automatically on the contact of said train with another of said track contacts.

4. Railway safe running apparatus comprising track contacts including two warning track contacts arranged one in advance of the other and other track contacts, means on a train adapted to make contact with said warning contacts successively, appliances for regulating a road corresponding to each of said warning contacts, means adapted to be affected by said appliances so as to enable said train on making contact with each of said warning contacts to complete a circuit only when said appliances are properly set for a train to proceed along said road, another circuit, means adapted to cause the second mentioned circuit to be broken by the completion of the first mentioned circuit, the second mentioned circuit corresponding to each of said warning contacts, including in common one of said other track contacts, and means adapted to cause the second mentioned circuit when unbroken to give an indication on said train during the contact thereof with a corresponding warning contact.

5. Railway safe running apparatus comprising a testing track contact, a signaling track contact, means on a train adapted to make contact with said track contacts simultaneously, appliances for regulating a road corresponding to said track contacts, means adapted to be affected by said appliances so as to enable said train on making contact with said testing track contact to complete a circuit including said testing contact only when said appliances are properly set for a train to proceed along said road, another circuit including means adapted to cause the second mentioned circuit to be broken by the completion of the first mentioned circuit, and means adapted to cause the second mentioned circuit when unbroken to give an indication automatically on the said train during the contact thereof with said testing contact.

6. Railway safe running apparatus comprising a testing track contact, a stopping track contact, means on a train adapted to make contact with said track contacts simultaneously, appliances for regulating a road corresponding to said track contacts, means adapted to be affected by said appliances so as to enable said train on making contact with said testing track contact to complete a circuit including said testing contact only when said appliances are properly set for a train to proceed along said road, another circuit including said stopping contact, means adapted to cause the second mentioned circuit to be broken by the completion of the first mentioned circuit, and means adapted to cause the second mentioned circuit when unbroken to give an indication automatically on said train during the contact thereof with said testing contact.

7. Railway safe running apparatus comprising a testing track contact, a signaling track contact, means on a train adapted to make contact with said track contacts simultaneously, appliances for regulating a road corresponding to said track contacts, means adapted to be affected by said appliances so as to enable said train on making contact with said testing track contact to complete a circuit including said testing contact only when said appliances are properly set for a train to proceed along said road, another circuit including said signaling contact, and means adapted to cause the second mentioned circuit to give an indication automatically on said train on the non-completion of the first mentioned circuit by the contact of said train with said testing contact.

8. Railway safe running apparatus comprising a testing track contact, a stopping track contact, means on a train adapted to make contact with said track contacts simultaneously, appliances for regulating a road corresponding to said track contacts, means adapted to be affected by said appliances so as to enable said train on making contact with said testing track contact to complete a circuit including said testing contact only when said appliances are properly set for a train to proceed along said road, a circuit including said stopping contact, and means adapted to cause the second mentioned circuit to stop said train automatically on the non-completion of the first mentioned circuit by the contact of said train with said testing contact.

9. Railway safe running apparatus comprising two track contacts corresponding respectively to two roads, means on a train adapted to make contact with each of said track contacts, appliances for regulating the roads corresponding respectively to said track contacts, means adapted to be affected by said appliances so as to enable said train on making contact with each of said track contacts to complete a circuit only when such appliances are properly set for a train to proceed along the road corresponding thereto, and means adapted to give automatically on said train an indication differing for each of said contacts, of the non-completion of the corresponding circuit by the contact of said train with the corresponding track contact.

10. Railway safe running apparatus comprising testing track contacts, means on a train adapted to make contact with said track contacts, appliances for regulating a road corresponding to each of said track contacts, means adapted to be affected by said appliances so as to enable said train on making contact with the corresponding track contact to complete a testing circuit only when said appliances are properly set for a train to proceed along said road, a switch device on said train, indicating track contacts having their operative surfaces so arranged as to give said switch device different displacements respectively, indicating circuits adapted to be completed singly by said switch device when given said different displacements respectively by said indicating track contacts and to give on said train different indications when so completed, each testing circuit and the corresponding indicating circuit including a testing track contact in common, and means adapted to cause an indicating circuit to be broken by the completion of a corresponding testing circuit.

11. Railway safe running apparatus comprising testing track contacts, means on a train adapted to make contact with said track contacts, appliances for regulating a road corresponding to each of said track contacts, means adapted to be affected by said appliances so as to enable said train on making contact with the corresponding track contact to complete a testing circuit only when said appliances are properly set for a train to proceed along said road, a switch device on said train, indicating track contacts having their operative surfaces arranged at different heights so as to give said switch device different displacements respectively, indicating circuits adapted to be completed singly by said switch device when given said different displacements respectively by said indicating track contacts and to give on said train different indications when so completed, each testing circuit and the corresponding indicating circuit including a testing track contact in common, and means adapted to cause an indicating circuit to be broken by the completion of the corresponding testing circuit.

12. Railway safe running apparatus comprising testing track contacts, means on a train adapted to make contact with said track contacts, appliances for regulating a road corresponding to each of said track contacts, means adapted to be affected by said appliances so as to enable said train on making contact with the corresponding track contact to complete a testing circuit only when said appliances are properly set for a train to proceed along said road, a switch device on said train, indicating track contacts having their operative surfaces arranged at different heights and in line longitudinally of the track so as to give said switch device different displacements respectively, indicating circuits adapted to be completed singly by said switch device when given said different displacements respectively by said indicating track contacts and to give on said train different indications when so completed, each testing circuit and the corresponding indicating circuit including a testing track contact in common, and means adapted to cause an indicating circuit to be broken by the completion of the corresponding testing circuit.

13. Railway safe running apparatus comprising testing track contacts, means on a train adapted to make contact with said track contacts, appliances for regulating a road corresponding to each of said track contacts, means adapted to be affected by said appliances so as to enable said train on making contact with the corresponding track contact to complete a testing circuit only when said appliances are properly set for a train to proceed along said road, a switch device on said train, indicating track contacts having their operative surfaces arranged at different heights and in line longitudinally and centrally of the track so as to give said switch device different displacements respectively, indicating circuits adapted to be completed singly by said switch device when given said different displacements respectively by said indicating track contacts and to give on said train different indications when so completed, each testing circuit and the corresponding indicating circuit including a testing track contact in common, said means adapted to cause an indicating circuit to be broken by the completion of the corresponding testing circuit.

14. Railway safe running apparatus comprising two track contacts corresponding respectively to two roads, means on a train adapted to make contact with each of said track contacts, said track contacts having their operative surfaces so arranged as to move said means to different extents respectively, appliances for regulating the roads corresponding respectively to said track contacts, means adapted to be affected by said appliances so as to enable said train on making contact with each of said track contacts to complete a circuit only when such appliances are properly set for a train to proceed along the road corresponding thereto, and means adapted to give automatically on said train an indication differing for each of said contacts, and dependent for its difference on the extent of movement of the first mentioned means by the corresponding track contact, of the non-completion of the corresponding circuit by the contact of said train with the corresponding track contact.

15. Railway safe running apparatus comprising two track contacts corresponding respectively to two roads, means on a train adapted to make contact with each of said track contacts, said track contacts having their operative surfaces arranged at different heights so as to move said means to different extents respectively, appliances for regulating the roads corresponding respectively to said track contacts, means adapted to be affected by said appliances so as to enable said train on making contact with each of said track contacts to complete a circuit only when such appliances are properly set for a train to proceed along the road corresponding thereto, and means adapted to give automatically on said train an indication, differing for each of said contacts, and dependent for its difference on the extent of movement of the first mentioned means by the corresponding track contact, of the non-completion of the corresponding circuit by the contact of said train with the corresponding track contact.

16. Railway safe running apparatus comprising two track contacts corresponding respectively to two roads, means on a train adapted to make contact with each of said track contacts, said track contacts having their operative surfaces arranged at different heights and in line longitudinally of the track so as to move said means to different extents respectively, appliances for regulating the roads corresponding respectively to said track contacts, means adapted to be affected by said appliances so as to enable said train on making contact with each of said track contacts to complete a circuit only when such appliances are properly set for a train to proceed along the road corresponding thereto, and means adapted to give automatically on said train an indication, differing for each of said contacts, and dependent for its difference on the extent of movement of the first mentioned means by the corresponding track contact, of the non-completion of the corresponding circuit by the contact of said train with the corresponding track contact.

17. Railway safe running apparatus comprising two track contacts corresponding respectively to two roads, means on a train adapted to make contact with each of said track contacts, said track contacts having their operative surfaces arranged at different heights and in line longitudinally and centrally of the track so as to move said means to different extents respectively, appliances for regulating the roads corresponding respectively to said track contacts, means adapted to be affected by said appliances so as to enable said train on making contact with each of said track contacts to complete a circuit only when such appliances are properly set for a train to proceed along the road corresponding thereto, and means adapted to give automatically on said train an indication, differing for each of said contacts, and dependent for its difference on the extent of movement of the first mentioned means by the corresponding track contact, of the non-completion of the corresponding circuit by the contact of said train with the corresponding track contact.

18. Railway safe running apparatus comprising track contacts, means on a train adapted to make contact with said track contacts, appliances for regulating a road corresponding to one of said track contacts, means adapted to be affected by said appliances so as to enable said train on making contact with the last mentioned track contact to complete a circuit only when said appliances are properly set for a train to proceed along said road, another circuit, means including a track electro-magnetic switch device and adapted to cause the second mentioned circuit to be broken by the completion of the first mentioned circuit, each of said circuits including one and the same of said track contacts, and means adapted to cause the second mentioned circuit when unbroken to give an indication automatically on said train during the contact thereof with said last mentioned track contact.

19. Railway safe running apparatus comprising a track contact, means on a train adapted to make contact with said track contact, appliances for regulating a road corresponding to said track contact, means adapted to be affected by said appliances so as to enable said train on making contact with said track contact to complete a circuit only when said appliances are properly set for a train to proceed along said road, and means including a track electro-magnetic switch device and adapted to give an indication automatically on said train of the non-completion of said circuit by the contact of said train with said track contact.

20. Railway safe running apparatus comprising track contacts, means on a train adapted to make contact with said track contacts, levers corresponding with two of said contacts and relating to the making of clear roads for said train in conflicting directions respectively, means adapted to prevent both said levers from being set to make clear roads in both said conflicting directions simultaneously, and for each of said levers an electric circuit adapted to be completed by said train when in contact with one of said track contacts only when the corresponding one of said levers is in the position for making a clear road for said train, another electric circuit including the last mentioned track contact, means adapted to cause the second mentioned circuit to be broken by the completion of the first mentioned circuit, and means adapted to cause the second mentioned circuit when unbroken to give an indication on said train during the contact thereof with the last mentioned track contact.

21. Railway safe running apparatus comprising track contacts, means on a train adapted to make contact with said track contacts, levers corresponding with two of said contacts and relating to the making of clear roads for said train in conflicting directions respectively, a pivoted member adapted to prevent both said levers from being set to make clear roads in both said conflicting directions simultaneously and for each of said levers an electric circuit adapted to be completed by said train when in contact with one of said track contacts only when the corresponding one of said levers is in the position for making a clear road for said train, another electric circuit including the last mentioned track contact, means adapted to cause the second mentioned circuit to be broken by the completion of the first mentioned circuit, and means adapted to cause the second mentioned circuit when unbroken to give an indication on said train during the contact thereof with the last mentioned track contact.

In testimony whereof I have signed my name to this specification in the presence of two subscribing witnesses.

ARTHUR REGINALD ANGUS.

Witnesses:
PERCY NEWELL,
O. MACINNES.

Copies of this patent may be obtained for five cents each, by addressing the "Commissioner of Patents, Washington, D. C."